July 31, 1945. G. W. DUNHAM 2,380,732
WASHING MACHINE
Filed April 30, 1941 9 Sheets-Sheet 1
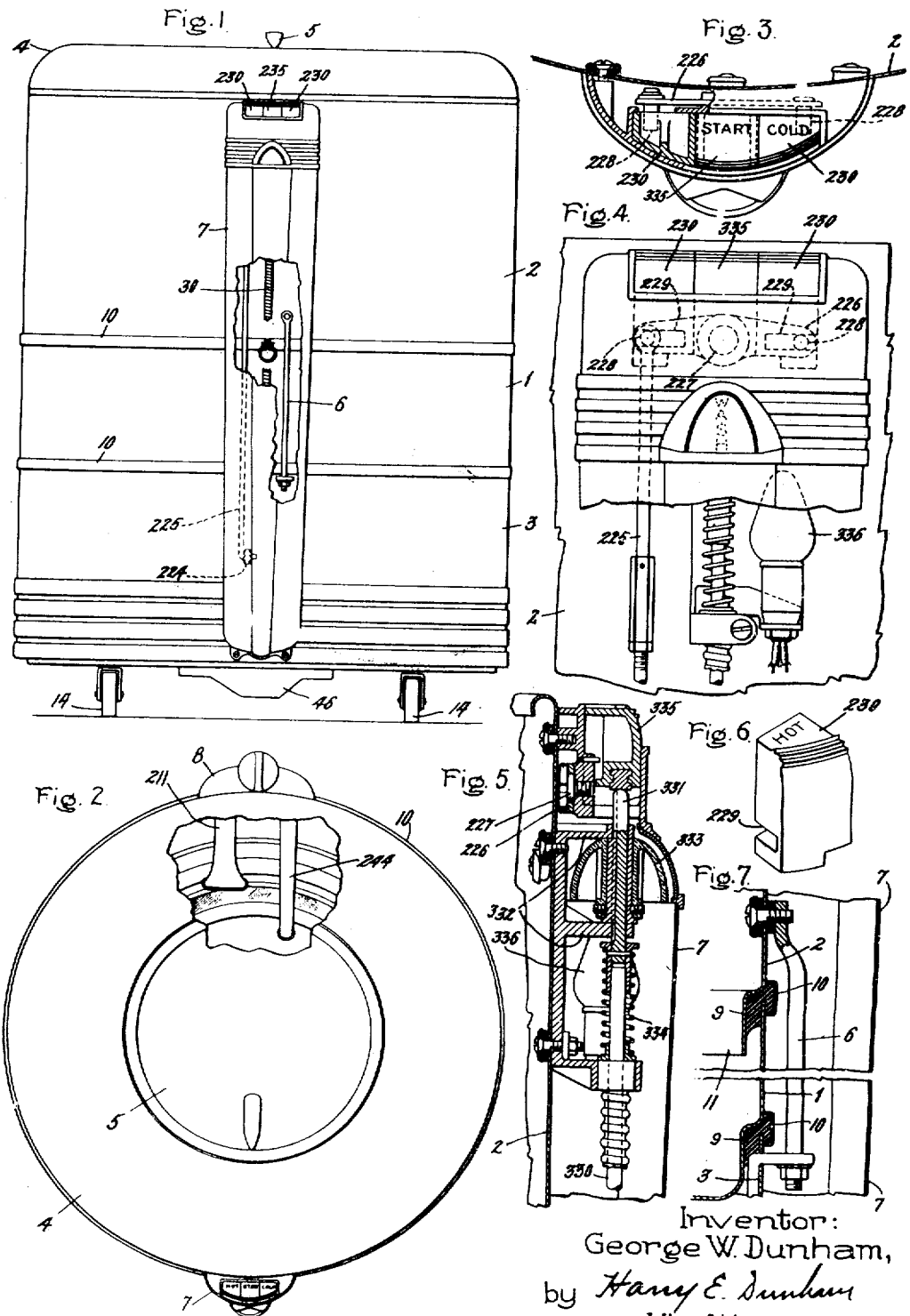
Inventor:
George W. Dunham,
by Harry E. Dunham
His Attorney.

July 31, 1945.  G. W. DUNHAM  2,380,732
WASHING MACHINE
Filed April 30, 1941   9 Sheets-Sheet 2
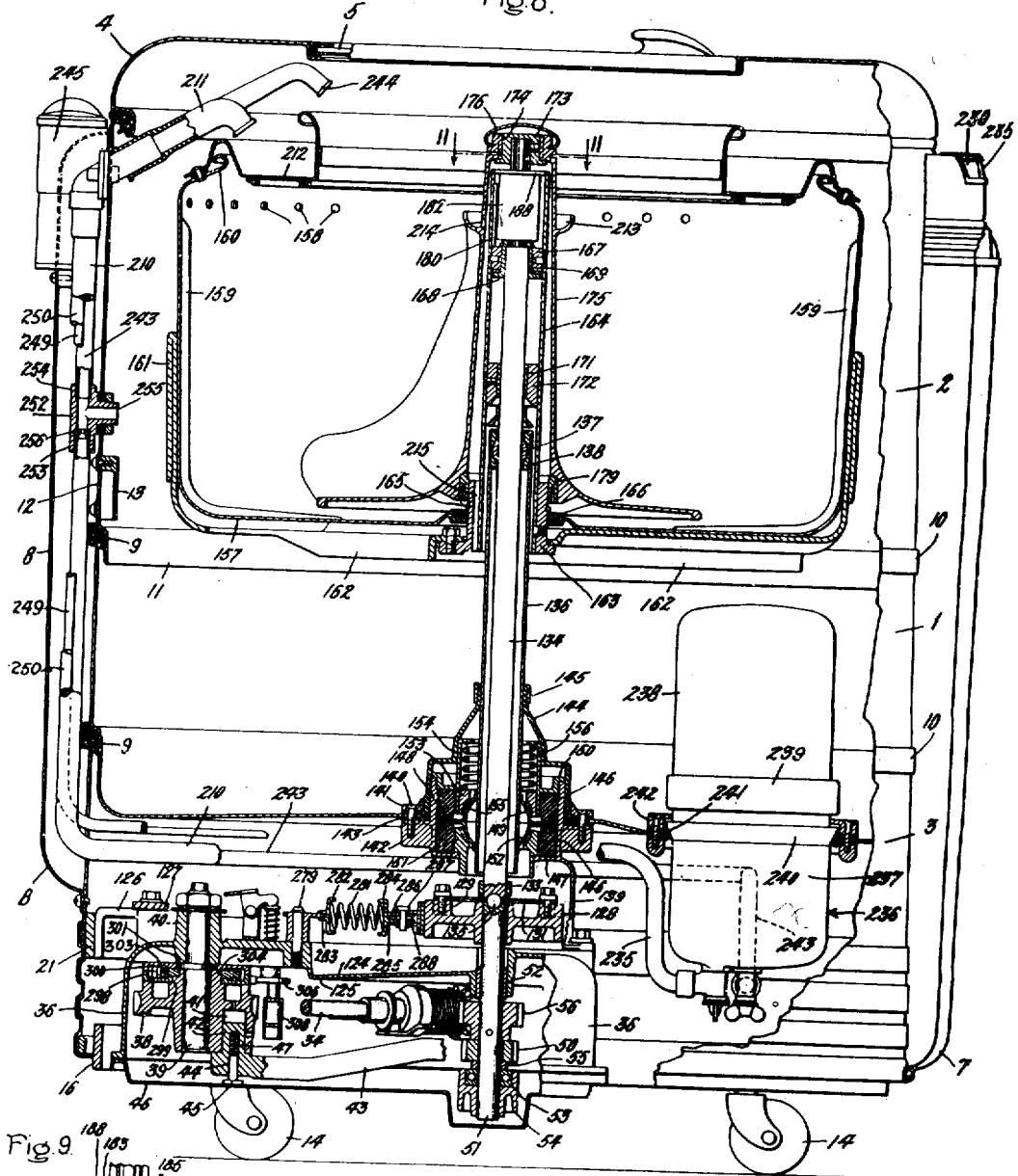
Inventor:
George W. Dunham,
by Harry E. Dunham
His Attorney.

July 31, 1945.  G. W. DUNHAM  2,380,732
WASHING MACHINE
Filed April 30, 1941  9 Sheets-Sheet 3
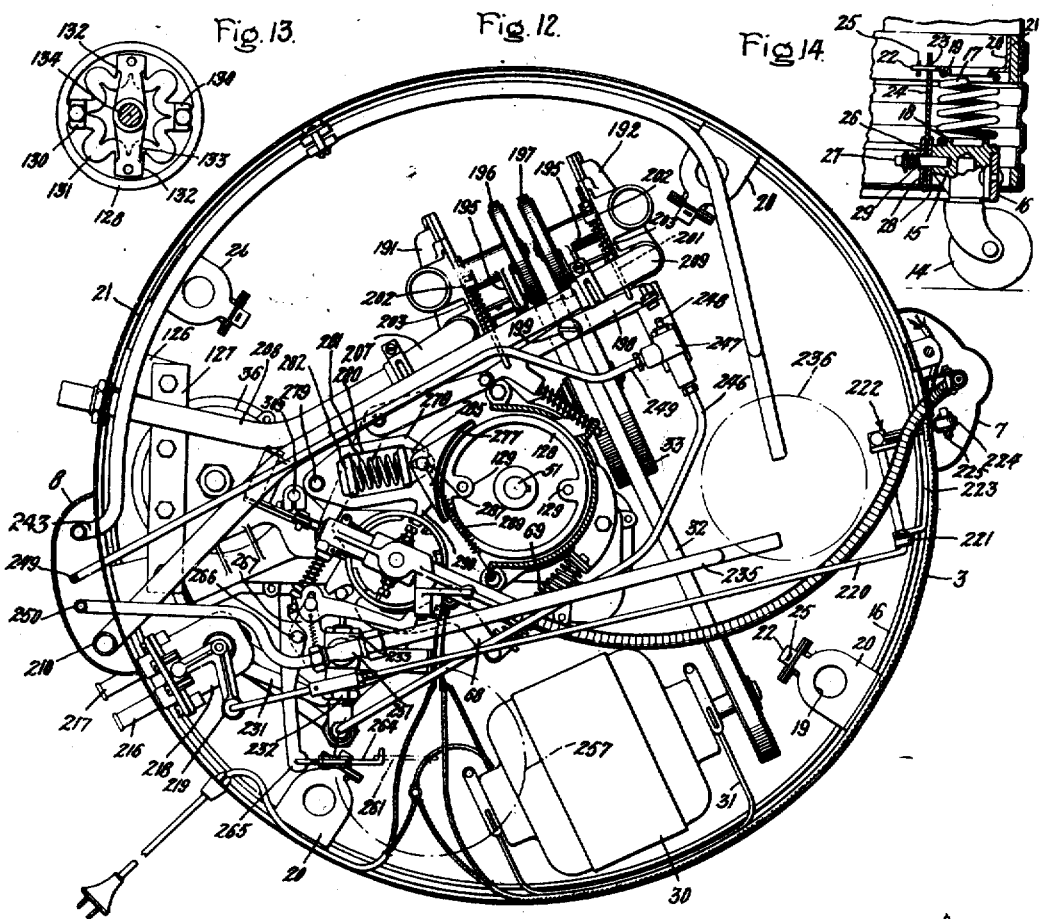
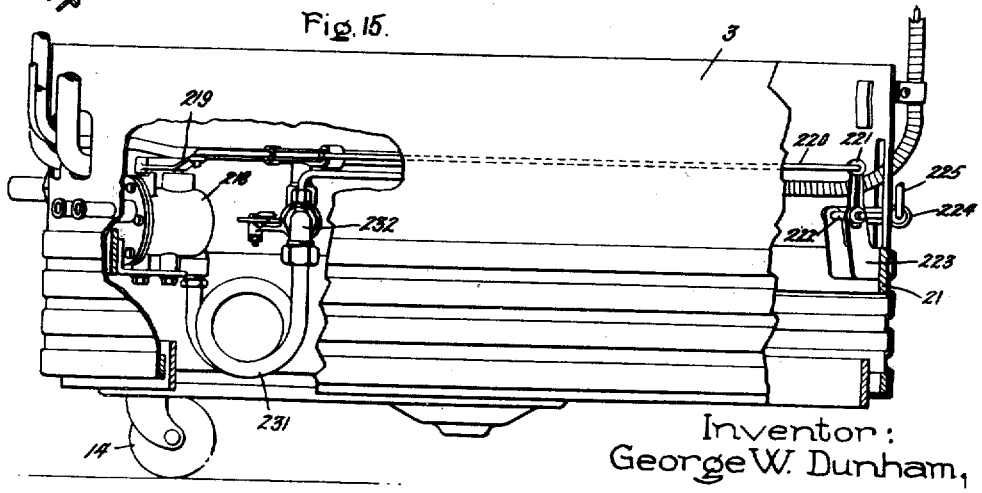
Inventor:
George W. Dunham,
by Harry E. Dunham
His Attorney.

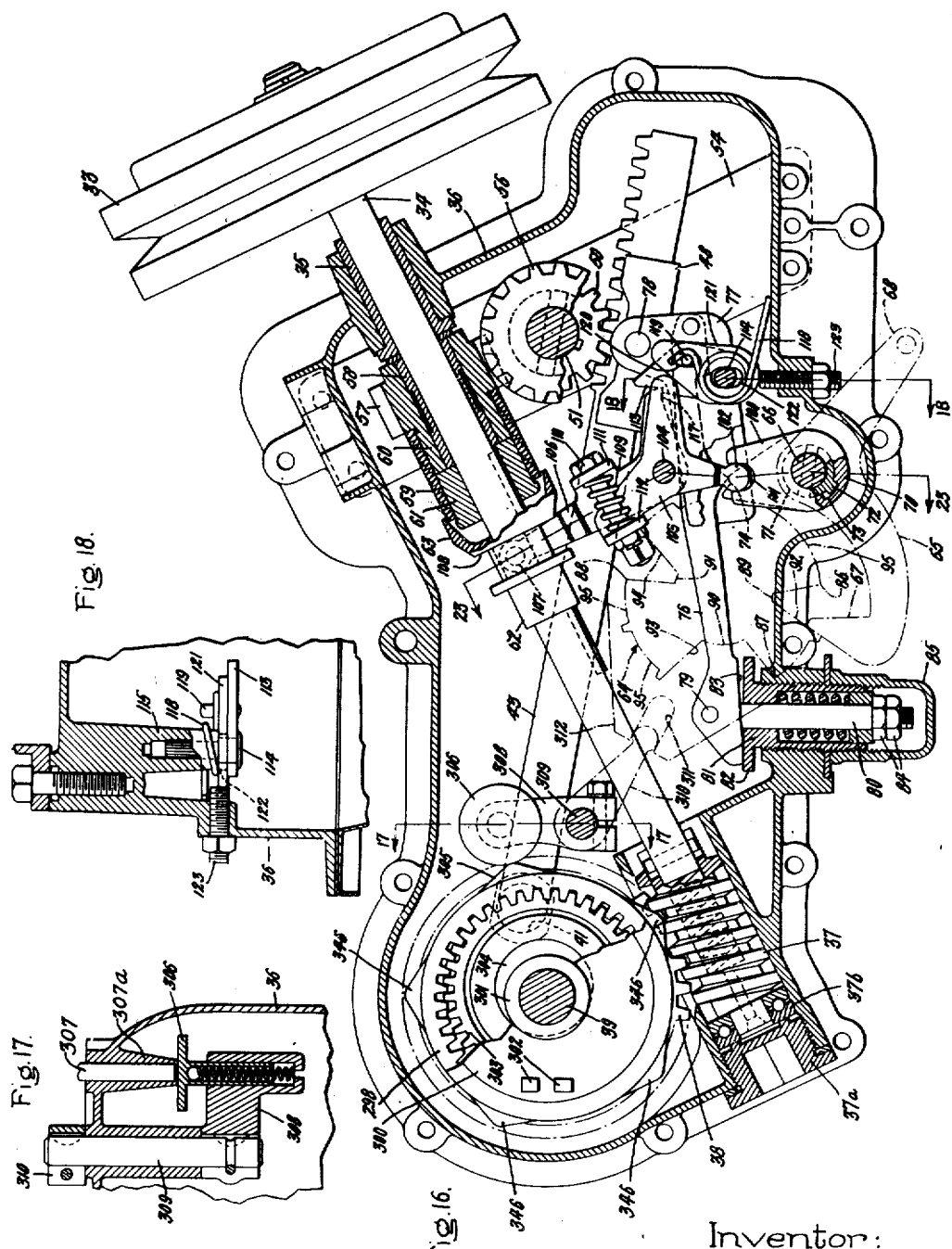

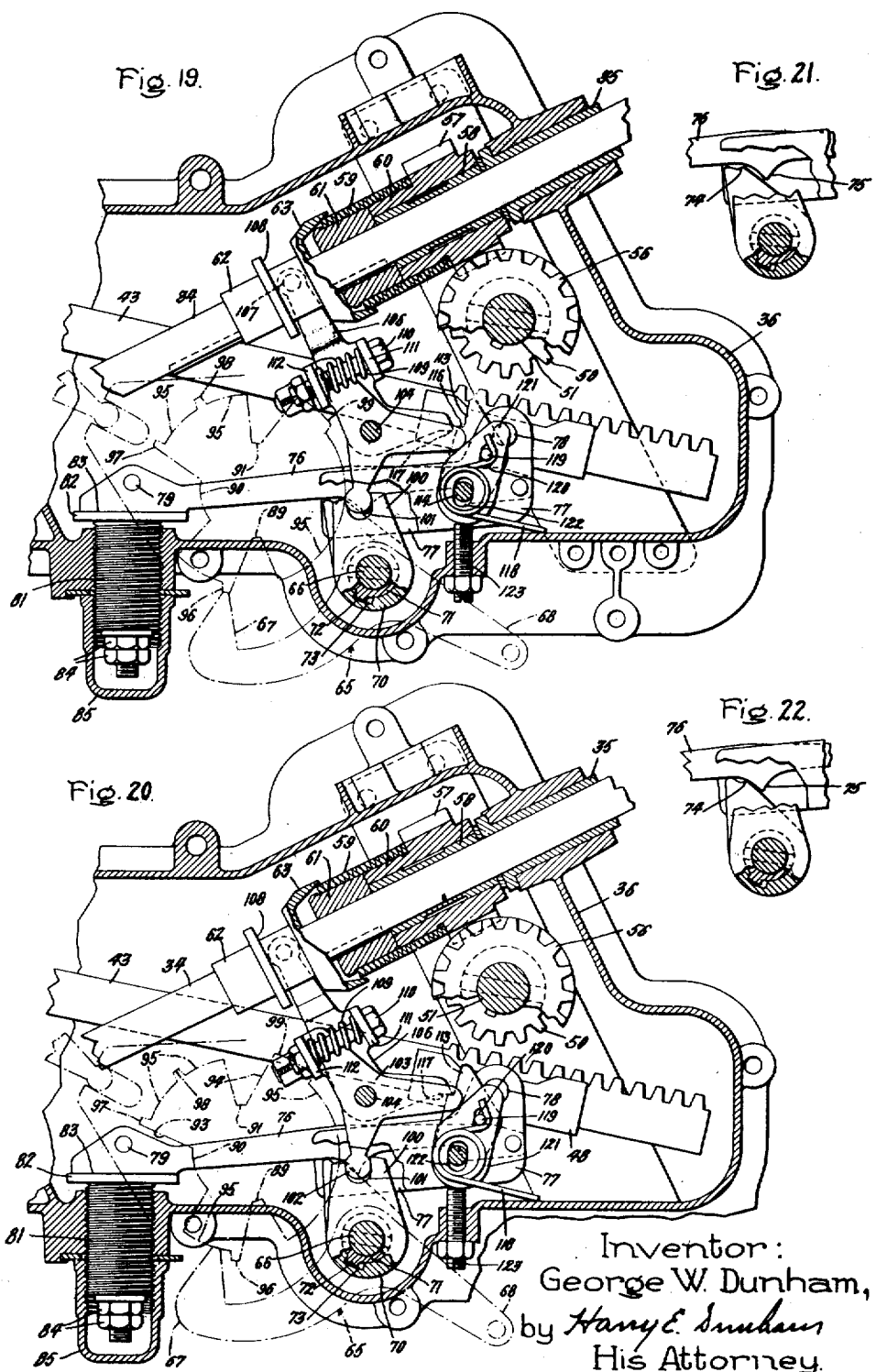

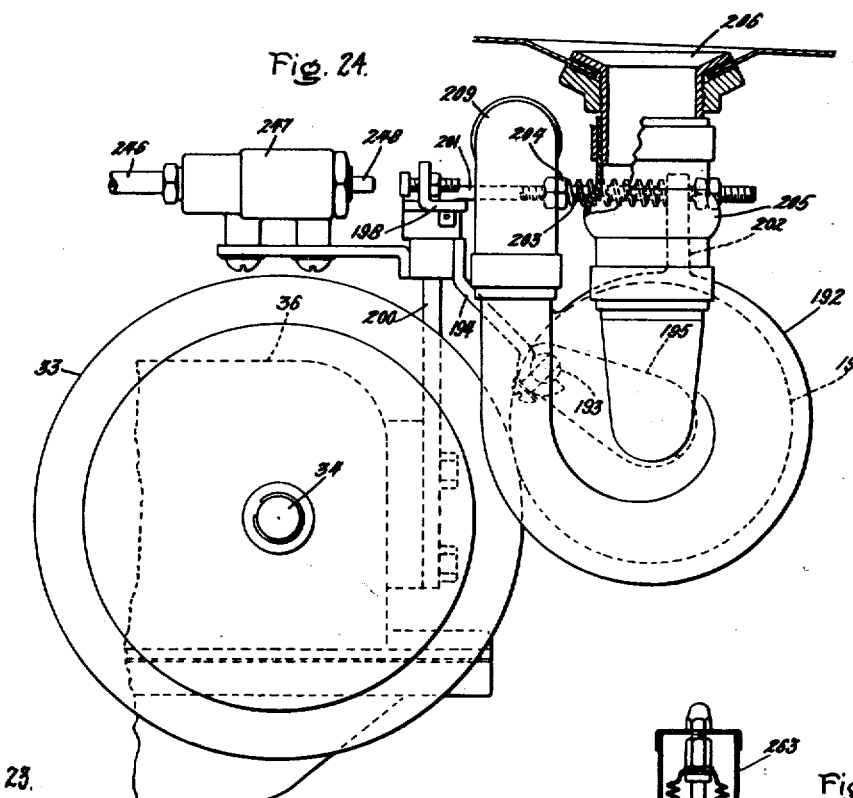
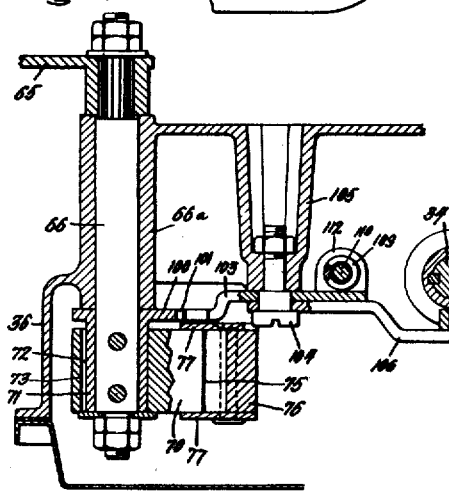
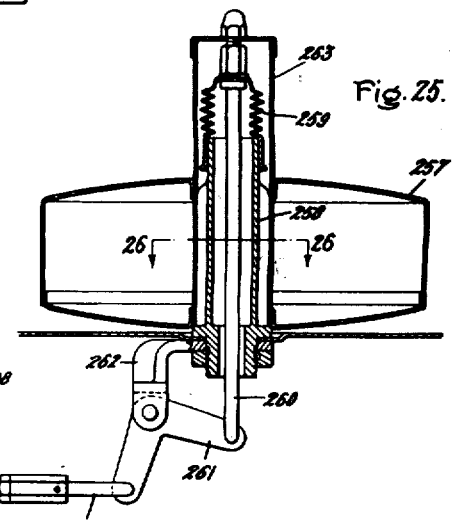
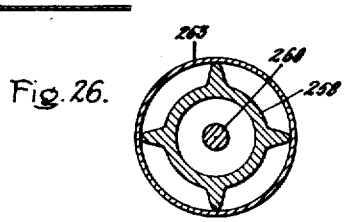

July 31, 1945. G. W. DUNHAM 2,380,732
WASHING MACHINE
Filed April 30, 1941 9 Sheets-Sheet 7
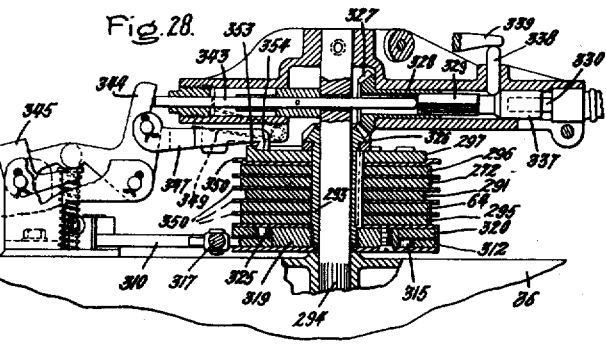
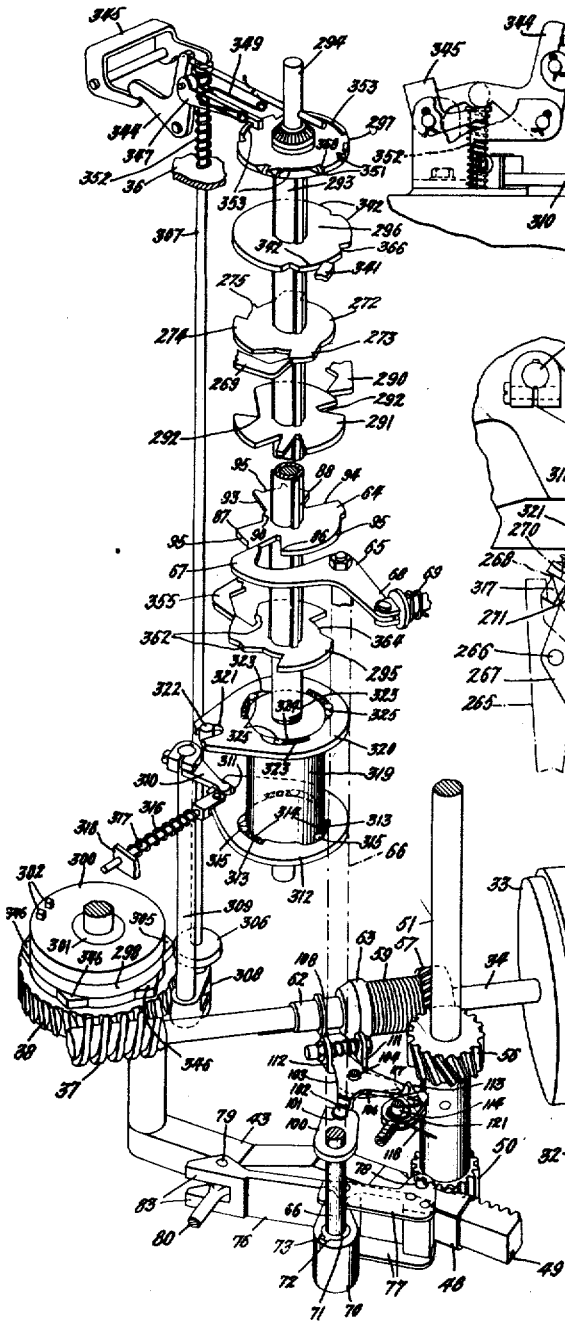
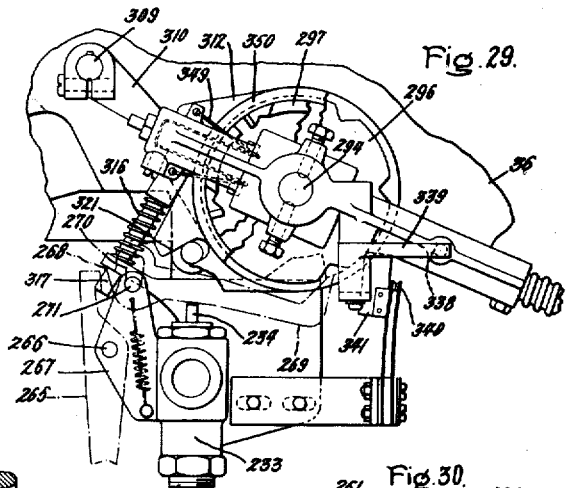
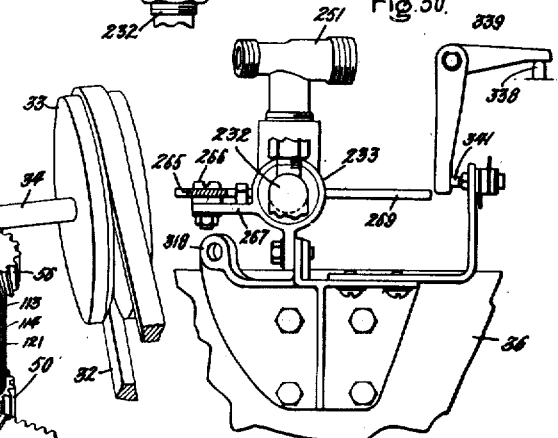
Inventor:
George W. Dunham,
by Harry E. Dunham
His Attorney.

July 31, 1945.　　　G. W. DUNHAM　　　2,380,732
WASHING MACHINE
Filed April 30, 1941　　　9 Sheets-Sheet 8
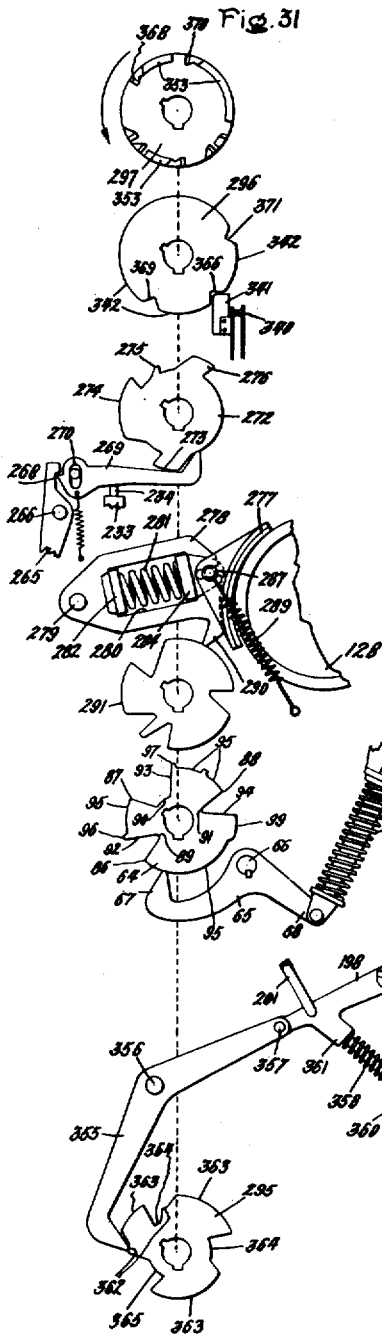
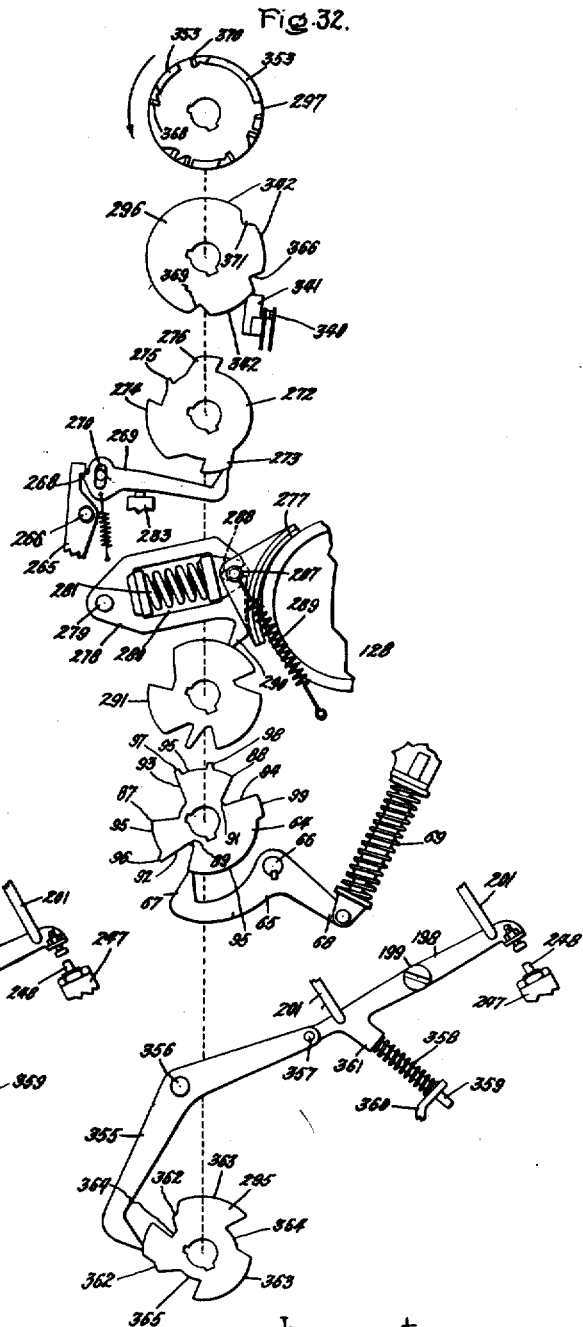
Inventor:
George W. Dunham,
by Harry E. Dunham
His Attorney.

July 31, 1945.　　　　G. W. DUNHAM　　　2,380,732
WASHING MACHINE
Filed April 30, 1941　　　9 Sheets-Sheet 9
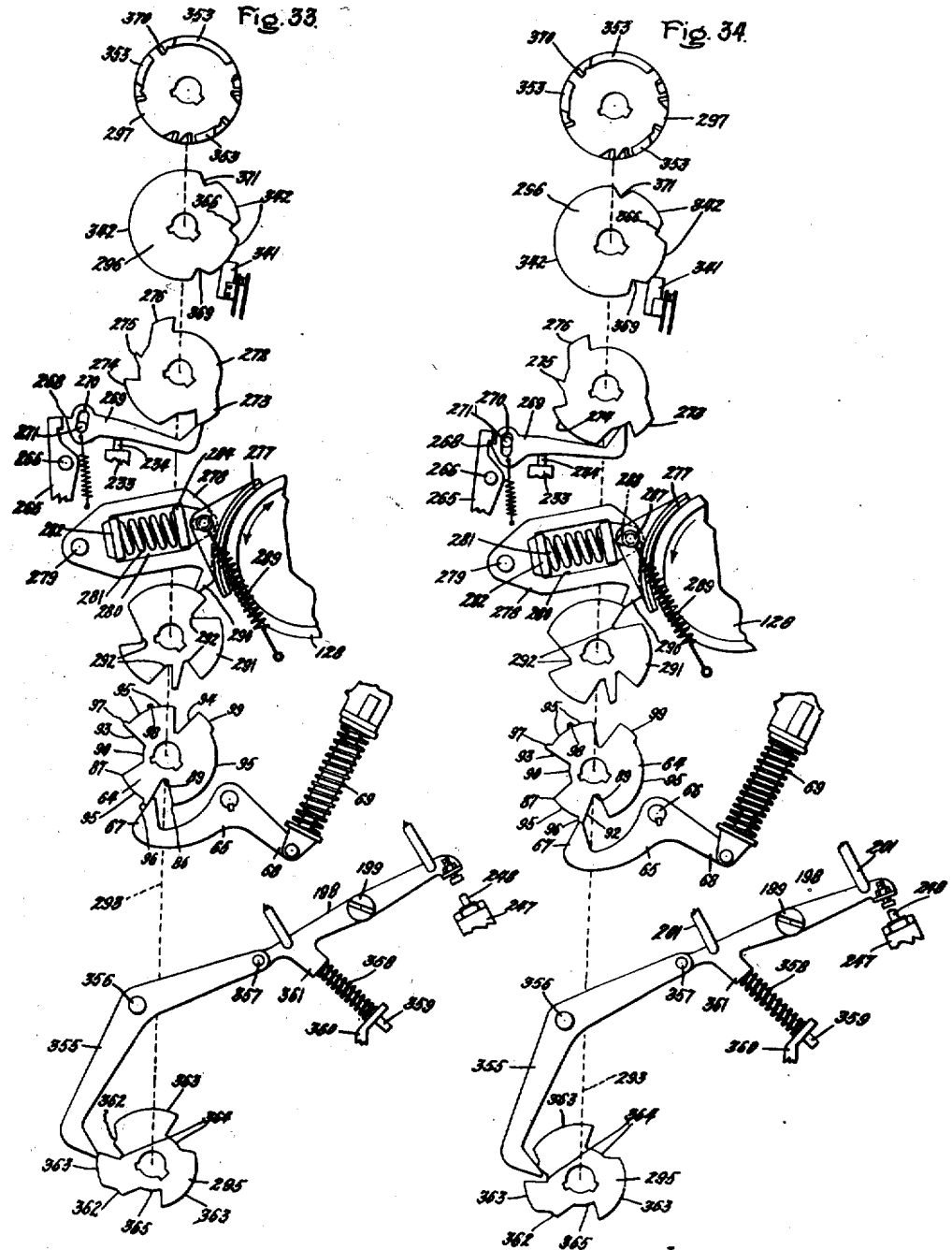
Inventor:
George W. Dunham,
by Harry E. Dunham
His Attorney.

Patented July 31, 1945

2,380,732

UNITED STATES PATENT OFFICE 2,380,732

WASHING MACHINE

George W. Dunham, Westport, Conn., assignor to General Electric Company, a corporation of New York Application April 30, 1941, Serial No. 391,113

9 Claims. (Cl. 68—12)

The present invention relates to washing machines of the type having mechanism for washing, rinsing, and drying clothes.

The object of my invention is to provide an improved construction and arrangement for controlling the liquid supply and removal, the washing, the rinsing, and the drying operations, which is particularly applicable to machines in which the clothes remain in the same receptacle throughout all of the operations. For a consideration of what I believe novel and my invention, attention is directed to the following description and the claims appended thereto.

In the accompanying drawings, Fig. 1 is a front elevation of a washing machine embodying my invention; Fig. 2 is a top plan view; Fig. 3 is an enlarged top plan view of the control knobs; Fig. 4 is a front elevation of the control knobs; Fig. 5 is a sectional elevation of the control knobs; Fig. 6 is a perspective view of one of the control knobs; Fig. 7 is a sectional elevation showing the manner of clamping the casing sections together; Fig. 8 is a sectional elevation of the washing machine; Fig. 9 is a sectional view of the upper end of the spinner basket hub; Fig. 10 is a sectional view taken on line 10—10 of Fig. 9; Fig. 11 is a sectional view taken on line 11—11 of Fig. 8; Fig. 12 is a plan view of the driving mechanism and associated parts mounted within the skirt of the washing machine; Fig. 13 is a plan view of the universal joint connecting the driving mechanism with the lower end of the vertical shaft which effects the washing and centrifugal drying operations; Fig. 14 is a sectional elevation of one of the spring supports for the machine; Fig. 15 is a side elevation partly broken away of the lower end of the machine; Fig. 16 is a sectional view of the gear case, the parts being in the washing position in which the shaft is oscillated to effect oscillation of the agitator; Fig. 17 is a sectional view taken on line 17—17 of Fig. 16; Fig. 18 is a sectional view taken on line 18—18 of Fig. 16; Fig. 19 is a fragmentary sectional view of the gear case, the parts being in the spinning position in which the shaft is rotated at high speed; Fig. 20 is a view similar to Fig. 19, the parts being in the neutral position; Fig. 21 is a fragmentary view showing the position of the latch in the spinning position; Fig. 22 is a fragmentary view showing the position of the latch in the neutral position; Fig. 23 is a sectional view taken on line 23—23 of Fig. 16; Fig. 24 is an end view of the circulating pump and its driving and supporting construction; Fig. 25 is a sectional elevation of the float controlling the supply of water to the machine; Fig. 26 is a sectional view taken on line 26—26 of Fig. 25; Fig. 27 is an exploded perspective view of the timing mechanism and the cams controlling the machine; Fig. 28 is a sectional elevation of the cams; Fig. 29 is a top plan view of the cams; Fig. 30 is a side elevation of the water supply valve; and Figs. 31, 32, 33 and 34 are exploded views of the cams and associated mechanism at different points in the cycle of operation of the machine.

Referring to the drawings, there is shown a washing machine having an outer casing comprising telescoped sections 1 and 2. Section 1, which comprises the bottom of the outer casing, is telescoped within a supporting skirt 3. The upper end of the section 2 is partially closed by an annular top section 4 telescoped within the upper end thereof. The closure of the top of the casing is completed by a removable cover 5 at the center of the annular top section 4. The sections 1, 2, and 3 are rigidly secured together by tie rods 6 (Fig. 7) respectively enclosed by a pilaster 7 at the front of the machine and a pilaster 8 at the rear of the machine. At the joints between the respective casing sections are rubber packing bands 9 which are seated on the upper edges of the respective casing sections. The exposed outer edges of the bands 9 are covered by decorative metal bands 10. With the above described casing structure the parts of the casing can be easily made from porcelain enamel drawn steel parts. Since each of the sections is relatively shallow the rubber packing bands at the joints between the sections permit a considerable variation in the dimensions of the sections which might result from warping during baking of the porcelain enamel. The lower casing section 1 extends slightly above the normal water level in the casing. The lower edge 11 of the upper casing section 2 projects slightly below the water level in the casing and, since it is slightly spaced from the inner wall of the casing, it tends to prevent surging of the water in the bottom of the casing during centrifugal drying. An overflow opening 12 covered by a splash guard 13 is provided in the part of the upper casing section 2 enclosed by the pilaster 8. The overflow opening 12 is necessary if the washing machine is to be permanently connected to water supply lines. It limits the maximum water level in the casing so that there is no danger of siphoning water from the casing back to the supply lines.

The machine is provided with casters 14 carried in caster brackets 15 (Fig. 14) fixed to a ring 16 and is resiliently supported on the casters by means of coil springs 17 arranged between seats 18 on the caster brackets 15 and seats 19 on brackets 20 carried by a stiffening ring 21 fixed to the inside of the skirt 3. At the inner ends of the brackets 20 are ears 22 extending through slots 23 in friction damping strips 24. The friction damping strips are kept on the ears 22 by means of U-shaped pins 25. There is substantially no clearance between the ears 22 and the slots 23 so that the friction damping strips 24 move with the outer casing. The lower ends of the friction damping strips are provided with elongated slots 26 through which extend pins 27 fixed in the caster brackets 15. The elongated slots 26 permit both vertical and pivotal movement of the strips 24 with reference to the pins 27. The lower ends of the strips 24 extend between washers 28 on the pins 27 which are pressed against the outer brackets by springs 29 on the pins 27. Both vertical and pivotal movement of the strips 24 with respect to the pins 27 are accordingly frictionally resisted by the washers. As shown in Fig. 12, the planes of the strips 24 are tangent to the skirt of the machine and the strips are uniformly spaced about the skirt. Vibration of the machine on the springs 17 in a horizontal plane can accordingly be resolved into components acting in the planes of the strips 24 which would cause pivotal movement of the strips about the pins 27. The friction damping obtained from the strips 24 and the associated parts accordingly serves to frictionally damp vibration of the machine in both horizontal and vertical directions.

The machine is driven by a motor 30 resiliently supported in a base 31 fixed to the skirt stiffening ring 21. Through a belt 32 the motor drives a pulley 33 connected by means of a friction clutch (not shown) to a shaft 34 journaled in a bearing 35 (Fig. 16) carried in the side walls of a gear casing 36. Fixed on the end of the shaft 34 is a worm 37 meshing with a worm gear 38 rotatably carried on a spindle 39 (Fig. 8) fixed in a boss 40 in the top wall of the gear casing. End thrust of the worm is taken upon an adjustable plug 37a through a ball bearing 37b. In the lower side of the worm gear is a cylindrical socket 41 (Fig. 8) receiving the crank pin 42 of a rack 43. In the under side of the crank pin 42 is a recess 44 rotatably receiving the shank of a pin 45. The lower end of the pin frictionally engages the bottom cover plate 46 of the gear casing. By means of a spring 47 arranged between the upper end of the shank of the pin and the bottom of the recess 44, the pin resiliently holds the crank pin 42 of the rack in the socket 41 and holds the worm gear 38 on the spindle 39. The friction between the pin and the cover plate 46 prevents over-travel of the rack during its reciprocation. The rack is slidably carried in a guide 48 having a tongue (not shown) which fits in a groove 49 (Fig. 27) in the under side of the rack. By moving the guide 48 the rack may be moved into and out of engagement with a pinion 50 keyed to a shaft 51 to effect oscillation of the shaft. The upper end of the shaft 51 is journaled in a bearing 52 in the top wall of the gear casing. The lower end of the shaft 51 is journaled in a ball thrust bearing 53 seated in a strut 54 extending across the side walls of the gear casing. The thrust of the shaft is transmitted to the bearing 53 through a thrust washer 55. Pinned to the shaft 51 above the pinion 50 is a spiral gear 56 meshing with a spiral gear 57 fixed to a sleeve bearing 58 loose on the shaft 34. The spiral gear 57 is clutched to the shaft 34 by means of a spiral spring 59 wrapped around a hub 60 integral with the gear 57 and around a sleeve 61 keyed to the shaft 34. One end of the coil spring 59 is fixed to the hub 60. The coil spring is so wound that it is normally loose on the sleeve 61. The driving connection between the sleeve 61 and the gear 57 is effected by means of a member 62 slidably keyed to the shaft 34 and having a conical end 63 arranged to grip the end of the coil spring 59 and cause the spring to wrap around the sleeve 61 to frictionally grip the same. The frictional engagement between the spring 59 and the sleeve 61 provides a slip connection between the shaft 34 and the gear 57 which causes high speed rotation of the shaft 51 through the gears 56 and 57.

For satisfactory operation it is desirable that the rack 43 be moved into and out of engagement with the pinion 50 and the clutch operating member 62 be moved into and out of engagement with the clutch spring 59 with a snap action and that provision be made so that the rack and the clutch operating member cannot be simultaneously in the engaged position. In the present construction the problem of obtaining snap action is made difficult by the fact that the rack and the clutch operating member 62 are controlled by a cam 64 on a timing shaft which rotates at a slow speed.

Both the rack and the clutch operating member 62 are controlled by a lever 65 fixed to a rock shaft 66 (Fig. 23) rotatably carried in a boss 66a in the top wall of the gear casing. One end 67 of the lever 65 cooperates with the cam 64. The other end 68 of the lever is biased in a clockwise direction, as viewed in Fig. 16, by a spring 69 (Figs. 12, 27). The connection between the lever 65 and the rack 43 is through a latch member 70 having a lost motion connection with the rock shaft 66 provided by a sleeve 71 pinned to the rock shaft and having a tongue 72 loosely fitting in a relatively wide groove 73 in the latch member 70. The latch member 70 has a seat 74 for a projection 75 on a lever 76 having plates 77 fixed thereto which are pivotally connected at 78 to the rack guide 48. The lever 76 is pivoted at 79 on a spring-pressed plunger 80 slidable in a sleeve 81 adjustably threaded into the side wall of the gear casing. The sleeve 81 is provided with a flat head 82 against which a flat surface 83 on the lever 76 is held when the rack is in the disengaged position shown in Figs. 19 and 20. When the rack is in the engaged position, shown in Fig. 16, the lever 76 is tilted so that the flat surface 83 is inclined with reference to the flat head 82 and only the left-hand end bears on the head, as shown in Fig. 16. The plunger 80 serves to limit the pressure between the rack and the pinion 50. The maximum pressure is adjustable by nuts 84 threaded on the plunger. Access to the adjusting nuts is obtained by removing a cover 85 threaded on the outer end of the sleeve 81.

During operation of the machine the cam 64 is rotated in a counterclockwise direction, as viewed in Fig. 16, at approximately one revolution per hour. When the cam reaches a position at which the end 67 of the lever 65 is at points 86, 87, or 88, the end of the lever drops suddenly into notches 89, 90, or 91, causing a sudden clockwise movement of the lever 65 under the force of the spring 69. Since the lever 65 is fixed to the rock shaft 66, the tongue 72 takes up the lost motion in the slot 73 in the latch member 70 and moves the latch member in a clockwise direction until the projection 75 rests in the seat 74 in the latch member. In this position the rack is moved into engagement with the pinion 50. The rack is moved with a snap action due to the sudden dropping of the lever 65 to the bottom of the notches 89, 90, or 91. Upon further rotation of the cam 64 the lever 65 is slowly cammed out of the notches by engagement with inclined surface 92, 93, or 94. During this movement the lever 65 is pivoted in a counterclockwise direction, and, when it reaches the point illustrated in Fig. 16, it has moved the tongue 72 to the opposite side of the groove 73, taking up the lost motion between the lever and the latch member 70. Upon a slight additional rotation of the cam 64 the lever is moved to a point at which the projection 75 is clear of the seat 74. The latch is no longer effective to hold the rack, and the pull exerted by the plunger 80 pivots the lever 76 to the position illustrated in Fig. 22, moving the rack away from the pinion. The rack is moved away from the pinion with a snap action. This is due to the lost motion between the tongue 72 and the groove 73 in the latch 70 which permits sudden movement of the latch even though the lever 65 is being moved very slowly. From one aspect the disengaging movement of the rack can be considered as effected by the tripping or releasing of the latch 70 so as to permit movement of the rack independent of the lever 65. The latch is tripped when the lever reaches a position corresponding to the arcuate sections 95 of the cam, which are the neutral positions of the cam, i. e., the positions in which neither the rack 43 nor the clutch 63 is engaged.

Upon further movement of the cam 64 after the rack has been moved to the disengaged position, the lever 65 is cammed onto one of the projections 96, 97, 98, or 99. This causes an additional counterclockwise movement of the rock shaft 66, resulting in a corresponding movement of an arm 100 integral with the sleeve 71. The arm 100 has a notch 101 receiving the rounded end 102 of a stamping 103 pivoted on a stud 104 carried in a boss 105 in the top wall of the gear casing (Fig. 23). Also pivoted on the stud 104 is an arm 106 having a projection 107 fitting in a groove 108 in the clutch operating member 62. The arm 106 is yieldably connected to the stamping 103 by a compression spring 109 arranged around a bolt 110 extending through ears 111 and 112 respectively on the arm 106 and the stamping 103. The spring 109 permits clockwise movement of the stamping 103, as viewed in Fig. 19, independent of the arm 106. However, upon movement of the stamping 103 in the reverse direction, the bolt 110 causes the stamping 103 and the arm 106 to move together. Movement of the arm 106 is prevented until the lever 65 reaches the top of one of the projections 96, 97, 98, or 99 by a latch 113 pivoted on a stud 114 (Fig. 18) fixed in a boss 115 in the top wall of the gear casing. The latch 113 has a seat 116 which cooperates with a pointed end 117 on the arm 106. The latch 113 is biased in a counterclockwise direction about the stud 114 by a spring 118, one end of which bears against the side wall of the gear casing and the other end of which engages a pin 119 on the latch which projects through a slot 120 in an adjusting plate 121. The adjusting plate has an elongated slot 122 through which the stud 114 extends, and its position is adjusted by a set screw 123 threaded in the side wall of the gear casing. The pointed end 117 of the arm 106 remains on the seat 116 of the latch 113 until the latch is moved away from the end 117 by the stamping 103 which engages the plate 121. This condition is reached when the arm 65 is in the position illustrated in Fig. 19. At this time the latch 113 is moved clear of the end 117 of the arm 106, and the arm 106, which has been previously held stationary by the latch while the spring 109 was being compressed, is moved with a snap action by the spring 109, moving the clutch operating member 62 into engagement with the clutch spring 59 and clutching the gear 57 to the shaft 34, as described above. Under this condition the shaft 51 is rotated at centrifugal extracting speed by the gears 56 and 57.

As the cam 64 moves from the position illustrated in Fig. 19 to the position illustrated in Fig. 20, the lever 65 drops off the projection 96, causing a sudden clockwise movement of the arm 100. This movement is transmitted to the arm 106 through the bolt 110 and causes sudden movement of the clutch operating member 62 away from the clutch spring 59. In the position shown in Fig. 20, the end 117 of the arm 106 is seated on the seat 116 of the latch 113.

During oscillation of the shaft 51, lubricant may creep up between the shaft and the sleeve bearing 52. This lubricant flows from the upper end of the bearing 52 into a well 124 in the top wall of the gear casing which has a drain opening 125 for returning the lubricant to the gear casing. The walls of the well are in the form of a hollow stiffening rib for the gear casing.

The gear casing is supported (Figs. 8 and 12) from the ring 21 by brackets 126 fixed to the ring and bolted to supporting arm 127 fixed to the top of the gear casing. In the above-described gear case construction the driving parts, except rack 43, are all carried by the top and side walls of the gear casing, and the cover plate 46 provides a bottom closure and supports rack 43 through pin 45 and spring 47. Due to this construction the gear case may be repaired and adjusted without disassembling the machine. It is necessary merely to tip the machine upside down and remove the cover plate 46, thus leaving all of the operating parts exposed. The opening 125 in the well 124 is so located that it is above the lubricant level in the gear casing in all positions.

Keyed to the shaft 51 is a brake drum 128 having diametrically opposed bosses 129 to which are bolted arms 130 of a universal joint 131 (Fig. 13). The arms 132 of the universal joint are bolted to opposite ends of an arm 133 fixed to the lower end of a vertical shaft 134. The gravity thrust of the vertical shaft 134 is transmitted to the shaft 51 through a thrust ball 135 arranged between bearings in the respective shaft ends (Fig. 8). With this arrangement the universal joint does not have to withstand any of the gravity thrust, and the friction of the universal joint, which tends to cause shaft whip or, in other words, forward precession of the shaft, is decreased. As shown in Fig. 13, the universal joint consists of an irregular sheet metal ring which is sufficiently flexible so that the vertical shaft 134 may have a gyratory movement with respect to the driving shaft 51. The friction in the universal joint is further decreased by the use of metal which has low internal friction compared to fabric.

The vertical shaft 134 extends through a sleeve 136, the upper end of which is above the normal water level in the outer casing or stationary tub. The upper end of the sleeve is provided with a spherical seat 138 for a self-lubricating bearing 137 which guides the shaft 134. The spherical seat permits alignment of the bearing 137 with the shaft 134, so that the bearing pressure is uniform regardless of the inclination of the shaft.

The gear casing 36 which houses the driving mechanism has fixed thereto a hollow post 139 which projects up through a central opening in the bottom wall of the casing and is secured thereto by means of screws 140 which are threaded through a clamping ring 141 into tapped holes in flange 142 on the post. Leakage from the bottom of the tub is prevented by means of a rubber washer 143 between the tub bottom and the flange 142 and by a rubber sleeve 144 which has its lower edge clamped between the clamping ring 141 and the bottom of the tub and has its upper edge clamped to the sleeve 136 by means of a clamp 145.

Within the post 139 is a resilient mounting for the lower end of the sleeve 136 which comprises two cushioning rings 146 of rubber or other resilient material. The lower ring is arranged between an inwardly extending flange 147 at the lower end of the post and a flange 148 projecting from a spherical member 149 fixed to the sleeve 136. The upper ring 146 is arranged between the upper side of the flange 148 and a nut 150 threaded into the upper end of the post 139. The nut 150 varies the compression of the rubber and thereby varies the stiffness of the mounting. With this mounting the sleeve 136 is resiliently held in a central position and is free to tilt in all directions in order that the shaft 134 may have a gyratory movement about the driving shaft 51. This means that the gear casing with its relatively heavy mechanism does not have to undergo a forced vibration due to gyration of the shaft 134.

The gyratory movement of the shaft 134 is damped by friction members bearing on the spherical member 149. The lower friction member comprises a ring 151 seated on the inner edge of the flange 147. The outer edge of the ring 151 bears against the inner edge of the lower cushioning ring 146, and the inner edge of the ring 151 is provided with a spherical seat carrying friction material 152 which bears on the spherical member 149. The upper friction member comprises a ring 153 slidably carried in a sleeve 154 integral with the nut 150. The ring 153 likewise has a spherical seat carrying friction material 155 which bears on the upper side of the spherical member 149. The outer edge of the sleeve 154 bears against the inner edge of the upper cushioning ring 146. The pressure between the friction material 152 and 155 and the spherical surface of member 149 is created by a coil spring 156 which presses against the upper edge of the ring 153. Since the ring 153 is slidable in the sleeve 154 the pressure on the spring 156 is not transmitted to the rubber rings 146 and therefore does not affect the resilient mounting for the sleeve 136. Also, the pressure exerted on the friction material is not affected by the inclination of the shaft 134.

In the upper part of the stationary tub is a rotatable spinner basket or receptacle 157 for receiving liquid and material to be washed. The space between the bottom of the receptacle and the bottom wall of the casing is sufficient to provide a storage space for all the liquid which can be placed in the receptacle. The side walls of the receptacle are imperforate and are tapered so that, as the receptacle is rotated, liquid will be discharged through openings 158 in its upper edge. Vertical ribs 159 in the receptacle side walls key the liquid to the receptacle at the start of the centrifugal extracting. At the upper edge of the receptacle above the openings 158 is an annular guard ring 160 which keeps the clothes within the receptacle during washing and extracting.

The receptacle is supported on a combined carrier and balance ring having annular reinforcing walls 161 surrounding the side walls of the receptacle and having spaced radial arms 162 beneath the bottom walls of the receptacle. The arms 162 are fixed to a sleeve 163 at the lower end of a hub 164. The receptacle is held on the carrier by means of a snap ring 165 on the sleeve 163. A rubber ring 166 on the receptacle bottom wall tightly engages the sleeve 163 and prevents leakage.

With this construction the carrier is not subject to the corrosive action of the washing solution and can therefore be made of a relatively cheap material, such as galvanized steel, while the receptacle, which must be made of non-corrosive material, such as porcelain enameled steel, can be relatively light. The receptacle can therefore be easily removed for cleaning. Another advantage of this construction is that the spacing of the arms 162 of the carrier is sufficient to permit easy access to the bottom and side walls of the outer casing when the receptacle 157 is removed. This facilitates the cleaning of the casing. Another advantage of this construction is that the annular reinforcing walls 161, which are relatively heavy, increase the mass of the receptacle and thereby serve as a balance ring which diminishes the amplitude of gyration due to unbalanced distribution of load within the receptacle. The balance ring need not be removed when the casing is cleaned.

The carrier is supported on the upper end of the vertical shaft 134 by a combined sleeve and thrust bearing 167 which is pinned to the hub 164 and which rests on a flange 168 on a sleeve 169 splined on the upper end of the shaft 134. The inner surface of the bearing 167 bears on the sleeve 169. The weight of the carrier and receptacle is transmitted from the bearing 167 through the flange 168 to a shoulder 170 on the shaft 134, and from the shaft 134 through the thrust ball 135 to the shaft 51 and its thrust bearing 53 immersed in the lubricant in the gear casing. The lower end of the hub 164 is guided on the shaft 134 by a sleeve bearing 171 fixed in a sleeve 172 secured to the inside of the hub. With this arrangement the carrier and receptacle are rotatably supported on the shaft 134, and the shaft 134 is normally free to rotate relative to the hub 164.

The splined end of the shaft 134 projects above the hub 164 and has a nut 173 splined thereon which fits within a complementary socket 174 in the hub of an agitator 175, providing a positive driving connection for the agitator. The agitator is held on the shaft by a wire clip 177 (Fig. 11) having a curved end 178 which fits in a groove in the nut 173. The upper ends of the hub 164 and the agitator extend above the normal water level in the receptacle, but, during washing, water is sometimes splashed over the upper end of the agitator. Leakage of this water around the shaft 134 is prevented by a cap 176 secured over the upper end of the agitator. The lower end of the agitator is guided on the sleeve 163 by a bearing 179 fixed in the agitator.

The driving connection between the vertical shaft 134 and the clothes receptacle 157 is effected by means of a lost motion clutch (Figs. 9 and 10) comprising a stop 180 fixed to the carrier hub 164 and a projection 181 on a sleeve 182 having a friction connection with the shaft 134. As is apparent from Fig. 10, the projection 181 will engage the stop 180 upon continuous rotation of the shaft 134 but will not engage the stop while the shaft is being oscillated through an angle somewhat greater than 180°, which is the normal angle of oscillation for the agitator. The friction connection between the sleeve 182 and the shaft 134 comprises a series of metal disks 183 and 184 with disks 185 of friction material arranged therebetween. The disks 183 are splined on the shaft 134. The disks 184, which are arranged intermediate the disks 183, are loose on the shaft 134 but have integral tongues 186 (Fig. 10) fitting in a groove 187 in the inner surface of the projection 181. The upper end of the sleeve 182 is closed by an integral wall 188 loosely surrounding the shaft 134. The disks 183 and 184 are pressed into frictional engagement with the disks 185 by a spring 189 arranged between the lowermost disk 183 and a washer 190 fixed within the lower end of the sleeve 182.

Below the bottom wall of the outer casing are a drain pump 191 and a circulating pump 192 (Fig. 12), each of which is pivotally supported (Fig. 24) on a pin 193 carried by a bracket 194 supported on the gear casing 36. The pumps are supported on the pins 193 by arms 195. The pumps are driven by pulleys 196 and 197 which are moved into and out of engagement with the pulley 33 by means of a lever 198 pivoted at 199 on a bracket 200 carried by the gear casing. The pumps are pivoted into and out of the driving positions by links 201 connected to opposite ends of the lever 198 and extending through bosses 202 on the pumps. Springs 203 arranged between the bosses 202 and nuts 204 threaded on the links 201 bias the pumps in a clockwise direction, as viewed in Fig. 24, about the pins 193, and accordingly tend to move the pump pulleys into engagement with the driving pulleys 33. Accordingly, upon movement of the lever 198 to the right, as viewed in Fig. 24, the spring 203 moves the pulley 197 of the pump 192 into engagement with the driving pulley. Upon movement of the lever 198 to the left, the pump is pivoted in the opposite direction to move its pulley 197 away from the driving pulley 33. Since the links 201 are connected to opposite ends of the lever 198, it is apparent that one of the pumps will be stopped while the other pump is in the running position. Both of the pumps 191 and 192 have their inlets connected by flexible hose 205 to drain openings 206 in the bottom of the outer casing. The discharge of the pump 191 is connected by a flexible hose 207 to a conduit 208 leading to a drain. The discharge of the pump 192 is connected by a flexible hose 209 to a conduit 210 extending up through the pilaster 8 and terminating in a nozzle 211 discharging onto an annular filter 212 seated on guard ring 160 of the receptacle 157. While the pump 191 is operating, the water in the bottom of the outer casing will be pumped to the drain. While the pump 192 is operating, the water in the bottom of the outer casing will be pumped onto the filter 212 and returned to the receptacle. The circulating pump 192 effects a continuous circulation and filtering of the water in the receptacle.

At the upper end of the agitator 175 is an annular trough 213 (Fig. 8) the upper edge of which is at or slightly below the centrifugal discharge openings 158. While the agitator is being oscillated, water currents are produced in the clothes receptacle which flow generally radially outward from the agitator along the bottom wall of the receptacle, upward along the receptacle side walls, and radially inward toward the trough 213. Solid particles suspended in the wash water, such as lint and the reaction products of soap, tend to rise to the surface of the water and either to overflow through the centrifugal discharge openings 158 or to be carried by the radially inward water currents at the surface of the water into the trough 213. The water entering the trough flows therefrom through openings 214 in the agitator to the space between the agitator and the carrier hub 164. From this space the water flows through openings 215 in the sleeve 163 into the bottom of the outer casing, whence it is pumped through the conduit 210 onto the filter 212. During washing, the surface water in the receptacle, which contains the greatest proportion of suspended particles, is accordingly continuously withdrawn from the receptacle, filtered so as to remove the suspended particles, and returned to the receptacle.

Water is supplied to the machine through conduits 216 and 217 (Fig. 12) respectively connected to the hot and cold water supply through a mixing valve 218 having a bell crank lever 219 which controls the proportions of the hot and cold water. The bell crank lever 219 is connected by a link 220 to one arm 221 (Fig. 15) of a bell crank lever 222 pivoted in a bracket 223 on the supporting ring 21. The other arm 224 of the bell crank lever 222 is connected by a link 225 extending through the pilaster 7 and connected at its upper end to one end of a lever 226 pivoted at 227 (Fig. 4). Opposite ends of the lever 226 are provided with pins 228 which fit in slots 229 in transparent plastic buttons 230. When the lever 226 is in a horizontal position, as illustrated in Fig. 4, the mixing valve 218 is adjusted to supply equal amounts of hot and cold water. The proportion of hot or cold water can be increased by pushing on the button labeled "Hot" or "Cold." This causes a tilting of the lever 226 which, through the linkage described above, changes the position of the bell crank 219 to alter the proportions of hot and cold water discharged from the mixing valve.

The discharge side of the mixing valve 218 is connected by a conduit 231 to a coupling 232 connected to a valve 233 (Fig. 29) controlled by a plunger 234 biased to the closed position. By pushing inward on the plunger 234, the valve is opened, permitting the flow of water through a conduit 235 to the bottom of a casing 236 containing a water softener element. As shown in Fig. 8, the water softener casing comprises a lower part 237 and an upper part 238 secured thereto by means of an easily releasable clamp 239. The lower casing part is provided with a flange 240 which is held in sealing engagement with a complementary flange 241 in the bottom of the casing by clamping rings 242. The lower casing part need not be removed during the normal use of the machine. By removing the clamp 239 the upper casing part 238 can be removed for inspection or replacement of the water softener element. Water from the softener flows through a conduit 243 connected to the bottom casing part 237, extending up through the pilaster 8, and discharging into the upper end of the receptacle 157 through a nozzle 244. Since the connections to the water softener are all in the permanently mounted lower part of the casing 37, it is not necessary to disturb these connections when the water softening element is cleaned or replaced. The part of the water softener casing which projects into the bottom of the outer casing serves as a baffle to prevent surging of the water during centrifugal drying.

At periodic intervals it is necessary that the water softening element be regenerated or reactivated by the addition of salt water. In the present construction the salt water is obtained from a salt box 245 mounted in the upper end of the pilaster 8. The salt box is connected to the water supply by a conduit 246 (Fig. 12) leading from the fitting 232 to a valve 247 supported on bracket 200 and controlled by a plunger 248 cooperating with the pump control lever 198. The valve 247 is biased to the closed position and is opened when the plunger 248 is pushed inward by the pump operating lever 198. When the pump operating lever actuates the plunger 248, the circulating pump is stopped and the drain pump is running. From the valve 247 water is conducted to the salt box through a conduit 249, and the salt water is conducted from the salt box to the water softener through a conduit 250 connected to a T-fitting 251 which is connected to the water softener by the conduit 235. A check valve (not shown) prevents reverse flow in conduit 250. The conduit 246 and the valve 247 are proportioned so that the rate of flow of water to the salt box is relatively small compared to the normal rate of flow through the water softener. It is desirable that the salt water used to regenerate the water softener be kept out of the receptacle. This is accomplished by a T-fitting 252 having the branches 253 and 254 connected in the conduit 243 leading to the receptacle and having the branch 255 extending through the side wall of the outer casing above the normal water level. In the branch 253 is a restricted orifice 256 which is effective at the rate of flow present when water is being supplied to the machine to produce an injector action in the branch 255 which produces a suction at this point and prevents the outward flow of water. The injector action produced by the orifice 256 is not present at the small rate of flow during regeneration of the water softener, and the regenerating water accordingly flows into the bottom of the casing through the branch 255 and is pumped to the drain by the pump 191.

The supply of water to the machine is controlled by an annular float 257 (Fig. 25) surrounding a hollow post 258 sealed to the bottom wall of the outer casing. The upper end of the post 258 is sealed by a bellows 259 fastened to a rod 260 extending through the post and connected at its lower end to a bell crank lever 261 mounted on the under side of the bottom wall of the casing on a bracket 262. The upper end of the rod 260 is connected to a cylindrical extension 263 on the float 257. While water is being supplied to the receptacle through the nozzle 244, the circulating pump 192 is running, so that any water flowing out of the receptacle through either the openings 158 or through the openings 215 associated with the trough 213 is pumped from the bottom of the outer casing back to the receptacle. It is desirable that the amount of water supplied to the receptacle be sufficient to fill the receptacle to the level of the openings 158 and, in addition, provide a relatively small amount of water in the bottom of the outer casing. This relatively small amount of water in the bottom of the outer casing raises the float 251 and lifts the rod 260, pulling a link 264 to the right, as viewed in Fig. 25. The link 264, as shown in Fig. 12, is connected to the lower end of a latch 265 pivoted at 266 on a bracket 267 on the valve 233. The upper end of the latch 265 cooperates with the pointed end 268 (Figs. 29, 31) of a lever 269 having a slot 270 providing a lost motion connection with a pin 271 on the bracket 267. The opposite end of the lever 269 cooperates with a cam 272 having projections 273, 274, 275, and 276. The intermediate portion of the lever 269 cooperates with the operating plunger 234 of the valve 233. When the cam 272 is in the position shown in Fig. 32 and the latch 265 engages the pointed end 268 of the lever 269, the projection 273 of the cam pivots the lever 269 about the latch and presses the valve operating plunger 234 inward, opening the valve. When the receptacle is filled, so it overflows through openings 158, the rise of the water level in the bottom of the outer casing lifts the float 257 and pivots the latch 265 away from the pointed end 268 of the lever 269. This releases the lever 269 and permits movement to the position shown in Fig. 33. The movement of the lever to this position is effected by the plunger 234 which is biased to the outer or closed position of the valve. Since the float is only called upon to trip a latch to shut off the water supply, its operation is independent of the pressure of the water supply.

The rotation of the receptacle is stopped at the conclusion of centrifugal extracting by means of a brake shoe 277 (Figs. 8 and 12) which cooperates with the brake drum 128. The brake shoe is carried by an arm 278 pivoted on a stud 279 fixed to the top wall of the gear casing. The arm has a rectangular opening 280 receiving a coil compression spring 281 which is arranged between a seat 282, fixed to the edge 283 of the opening 280, and a seat 284 having forked arms 285 slidable on the edge 286 and connected thereto by a pin 287 fixed in the arms 285 and fitting in an elongated slot 288 in the arm 278. The pin 287 also serves as a pivot for the brake shoe 277. The clearance between the pin 287 and the slot 288 permits the brake shoe to move inward, compressing the spring 281. When the pressure is removed, the spring 281 pushes the seat 284 against the edge 286 of the arm 278. The spring is assembled under an initial compression which is approximately equal to the maximum brake pressure. With such an arrangement the brake pressure is substantially uniform.

The brake shoe is urged into engagement with the brake drum by a tension spring 289 (Fig. 12), and is held out of engagement with the brake drum by a projection 290 carried by the brake arm 278 which cooperates with a cam 291.

The operation of the brake is best described with reference to Fig. 33. At the end of the centrifugal drying, the projection 290 is over one of the depressions 292 in the brake cam 291, permitting movement of the brake into engagement with the brake drum by the spring 289. If the brake drum is rotating, as will be the case immediately after the centrifugal drying operation, the frictional torque exerted by the brake drum on the brake shoe will tend to turn the brake arm 278 in a clockwise direction, as viewed in Fig. 33, until the projection 290 reaches the bottom of one of the depressions 292. Under this condition the brake shoe pivot pin 287 will be slightly above a center line connecting the stud 279 and the shaft 51. Due to this relation of the pivot points the brake is applied with a toggle action, causing it to be quickly and positively moved against the brake drum. The braking pressure under this condition is limited by the compression of the spring 281. As soon as the rotation has stopped, the pressure exerted by the spring 281 tends to turn the brake drum in a counterclockwise direction, as viewed in Fig. 33, returning the brake shoe to the position illustrated in Fig. 33. If the spring 281 fails to return the brake shoe, the brake shoe will be positively returned as the projection 290 is cammed out of the depression 292 by rotation of the brake cam 291.

The operation of the machine is controlled by a tubular timing shaft 293 rotatably carried on a stud 294 fixed in the top wall of the gear casing. Keyed on the timing shaft 293 are the cams 64, 272, and 291, previously described, and cams 295, 296, and 297. The timing shaft 293 is driven from the worm gear 38 through an internal gear 298 (Figs. 8, 16) rotatably carried on a shoulder 299 on the upper side of the worm gear. Above the internal gear 298 is an internal gear 300 seated on a flange 301 on the spindle 39 and having projections 302 (Fig. 27) on the upper side thereof fitting into depressions (not shown) in the top wall of the gear casing and holding the gear stationary. Between the gears 298 and 300 is a gear 303 (Fig. 16) rotatably carried on an eccentric 304 integral with the worm gear 38. The number of teeth on the gears 298 and 300 differs by one tooth and, accordingly, upon each rotation of the worm gear 38 the gear 298 is moved the distance of one tooth. On the outside of the gear 298 is a projection 305 cooperating with a roller 306 (Figs. 17 and 27) vertically slidable in an arm 308 fixed to a rock shaft 309 journalled in the top wall of the gear casing. The roller is spring biased against a boss 307a through which slidably extends a rod 307. The upper end of the rock shaft 309 has fixed thereto an arm 310 fitting in a notch 311 in a ratchet plate 312. The ratchet plate 312 is provided with inclined notches 313 carrying springs 314 urging rollers 315 toward the wide ends of the notches. As viewed in Fig. 27, the ratchet plate 312 is urged in a clockwise direction by a spring 316 surrounding a rod 317 connected at one end to the ratchet plate 312 and having its other end guided in an ear 318 on the bracket 261. As the roller 306 rides up on the projection 305, the rock shaft 309 is turned in a clockwise direction and, through the arm 310, moves the ratchet plate 312 in a counterclockwise direction. During this movement the rollers 315 are wedged between the notches 313 and a hub 319 fixed to the timing shaft 293. As the roller 306 falls off the projection 305, the rock shaft 309 is moved in a counterclockwise direction by the spring 316. During this movement the ratchet plate 312 turns freely on the hub 319 in a clockwise direction since the rollers 315 are held by the springs 314 in the wide ends of the notches 313. Backward movement of the timing shaft 293 is prevented by a ratchet plate 320 held stationary by a notch 321 fitting over a pin 322 fixed on the top wall of the gear casing. The ratchet plate 320 has notches 323 inclined opposite to the notches 313 and provided with springs 324 and rollers 325 similar to the previously described springs and rollers 314 and 315. The ratchet plate 320 is accordingly effective to prevent backward or clockwise movement of the timing shaft. With the above described construction the timing shaft 293 is rotated at a rate of approximately one revolution per hour.

Integral with the upper end of the timing shaft 293 is a bevel gear 326 meshing with a bevel gear 327 having a hub 328 provided with a square socket slidably receiving the squared end 329 of a flexible shaft 330. The other end of the flexible shaft is provided with a rigid extension 331 (Fig. 5) slidably carried in brackets 332 at the upper end of the pilaster 7. Splined on the extension 331 is an indicator 333 of transparent material carrying legends indicating the operation being performed. The flexible shaft is biased to the position illustrated in Fig. 5 by a spring 334. The upper end of the extension 331 bears against a transparent button 335. The indicator 333 and the buttons 320 and 335 are all illuminated by an electric light 336. By pushing down on the button 335 the flexible shaft is moved axially, causing movement of the squared end 329 to the left, as viewed in Fig. 28. The axial movement of the flexible shaft described above brings a cam sleeve 337 into engagement with a plunger 338 which cooperates with a bell crank lever 339 to close switch contacts 340 in the main power circuit for the machine in case the switch contacts are not already closed by a cam follower 341 fixed to one of the switch contacts and engaging one of the projections 342 on the switch cam 296. The movement of the flexible shaft also pushes a plunger 343 to the left, as viewed in Fig. 28, which, through bell crank levers 344 and 345, depresses the rod 307, moving the roller 306 out of cooperation with the projection 305 on the gear 298 and into cooperation with projections 346 integral with the worm gear 38. The worm gear 38 is turning at a much higher speed than the gear 298 and it is also provided with more projections. Accordingly, when the roller 306 cooperates with the projections 346, the timing shaft 293 is ratcheted at a much higher rate of speed. The speed depends upon the design but may be of the order of one revolution per minute as distinguished from one revolution per hour.

When the timing shaft drive is moved to the high speed position, a latch member 347 carried by the bell crank 344 is moved off the top of the index cam 297 and is pushed downward by a spring 349 onto a plate 350 between the index cam 297 and the switch cam 296. Similar plates 350 are arranged between each of the other cams. The latch 347 is held in this position by the edge of the index cam 297 until the end of the latch comes opposite one of the inclined notches 351 (Fig. 27) in the index cam, at which time the latch 347 is returned to the top of the index cam by a spring 352 acting on the bell crank lever 345 unless the button 334 is still being held by the operator in the depressed or high speed position. So long as the button 334 is depressed, the timing shaft is ratcheted at a high speed and the cams on the timing shaft successively actuate the control mechanism. The speed of movement of the timing shaft is such that none of the operations of the machine is more than momentarily started, and there is accordingly no danger from the high speed movement of the timing shaft in case the operator should hold the button 334 continuously depressed. However, during the centrifugal drying operation while the spinner basket is rotating at high speed, it is important to prevent shifting of the timing shaft to its high speed drive since there would not be time for the slowing down of the spinner basket and the movement of the rack to the washing position might injure the driving mechanism. Accordingly, while the machine is in the extracting position, movement to the high speed drive for the timing shaft is prevented by ridges 353 on the indexing cam 297 which cooperate with a hook 354 on the latch member 347. As is apparent from Fig. 28, the engagement of the hook 354 with the ridge 353 prevents axial movement of the rod 343 and accordingly prevents the shifting to the high speed drive for the timing shaft.

The operation of all of the cams except the pump control cam 295 has been previously described. The pump control cam 295 controls the drain and circulating pumps 191 and 192 through a lever 355 pivoted at 356 on the top of the gear casing and pivotally connected at 357 to the lever 198. The lever 355 is biased into engagement with the pump cam 295 by a spring 358 surrounding a rod 359 connected to the lever 198 guided in a projection 360 on the post 139. The spring 358 is arranged between the projection 360 and a projection 361 on the lever 198. When the pump control cam 295 is in a position in which the lever 355 engages sections 362, the pump control lever 198 is in its intermediate position in which both the drain and circulating pumps are stopped. When the pump control cam 295 is in a position in which the lever 355 engages projections 363, the lever 198 is tilted to a position in which the circulating pump is running and the drain pump is stopped. When the lever 355 engages sections 364 of the pump cam, the circulating pump is stopped and the drain pump is running. When the lever 355 engages the sections 365, which is radially inward of the sections 364, the drain pump is running and the regenerating valve 247 is opened by depression of the plunger 248.

At the start of the operation of the machine the cams are in the position illustrated in Fig. 31 in which the switch operating member 341 rests in the depression 366 in the switch operating cam, opening the switch contacts 340 in the power supply. After the clothes to be washed have been loaded in the spinner basket, the operation of the machine is started by momentarily depressing the start button, closing the switch contacts 340 through the sleeve 337 and plunger 338, and shifting the roller 306 into cooperation with the projections 346 to cause driving of the timing shaft 293 at its high speed. The start button 334 is held depressed until the switch cam moves to a position in which the projection 342 engages the switch operating member 341 and holds the switch contacts in the closed position. The timing shaft is driven at this high speed until the index cam 297 rotates to a position in which the latch 347 comes opposite point 368 in the index cam, at which time the drive for the timing shaft is shifted from the high speed drive to the normal speed drive. At this point the projection 273 on the water valve cam engages the lever 269 and opens the main water supply valve 233, causing the receptacle to be filled through the nozzle 244. The cycle of operation to be performed may be used either as a short washing cycle or as a soaking cycle, and the temperature of the water can be manually selected through the buttons 230 which control the mixing valve 218. The projection 273 has sufficient angular extent so that the lever 269 is held in the valve opening position longer than is necessary to fill the receptacle. When the receptacle is filled the water overflowing through the openings 158 raises the float 237 and moves the latch 265 away from the lever 269, permitting closing of the valve 233. While the receptacle is being filled, the circulating pump is moved to the running position by engagement of one of the projections 363 with the lever 355.

By having the circulating pump running while the receptacle is being filled, any water which might splash over the edge of the receptacle is kept from actuating the float 237 until the receptacle has been filled to the proper level. The position of the cams just prior to the tripping of the latch 265 by the float is shown in Fig. 32.

After the automatic filling of the receptacle, the lever 65 falls into the depression 89 in the cam 64, moving the rack 43 into engagement with the pinion 50 and causing oscillation of the agitator. The oscillation of the agitator continues until the lever 67 reaches the position shown in Fig. 33 in which the rack is moved out of engagement with the pinion. Upon rotation of the timing shaft to the position shown in Fig. 34, the lever 67 is moved onto the projection 96, moving the clutch operating member 62 into engagement with the clutch spring 59 and frictionally connecting the gear 57 to the shaft 34 to effect a high speed rotation of the receptacle through the gears 56 and 57. The centrifugal extracting operation lasts until the lever 67 falls off the projection 96, at which time the switch operating member 341 falls into the projection 369 in the switch cam, opening the switch contacts 340 and stopping the operation of the machine. The operation of the circulating pump 192 is continued throughout the washing operation and during the first part of the centrifugal drying. During washing, the circulating pump causes a continuous filtering of the wash water to remove suspended particles. At the start of centrifugal drying, the water discharged onto the filter flushes sediment off the filter. After the filter is flushed, the pump lever falls into one of the depressions 364, stopping the circulating pump and starting the drain pump which runs throughout the centrifugal drying operation and pumps the water in the bottom of the outer casing to the drain.

If the above described cycle of operations has been used for soaking the clothes, the clothes have been agitated in water and centrifugally dried by a short extracting operation. The clothes are now ready for washing in a soapy water.

The washing operation is started by momentarily depressing the start button 334 which closes switch contacts 340 and connects the timing shaft 293 to its high speed drive, causing rotation of the timing shaft to a position in which point 370 in the index cam 297 comes opposite the latch member 347. At this point the receptacle is filled with fresh water by engagement of the projection 274 with the lever 269, and the circulating pump is started by engagement of the lever 355 with the projection 363. As previously described, the water is shut off automatically by the float 237 when the receptacle is filled to the proper level. Following the filling of the receptacle, the clothes are washed during the period in which the lever 65 rests in the depression 90 in the cam 64, and the clothes are then centrifugally dried for the period during which the lever 65 rests on the projection 97. Following the centrifugal drying operation, water is again supplied to the receptacle by engagement of the projection 275 with the lever 269. The angular extent of the projection 275 is such that the receptacle will be only partially filled. This water settles on the clothes and removes some of the soap solution. This rinsing operation may be termed a "stationary rinse." Following this the receptacle is again rotated at its centrifugal drying speed by engagement of the projection 98 with the lever 65. The receptacle is now filled with fresh water by engagement of the projection 276 with the lever 269, the clothes are rinsed by oscillation of the agitator while the lever 65 rests in the depression 91, the clothes are centrifugally dried while the lever 65 rests on the projection 99, at the end of which the machine is shut down by engagement of the switch operating member 41 with the notch 371.

As in the previous cycles, the circulating pump operates during filling, during oscillation of the agitator, and for a short interval at the start of the centrifugal drying operation following each oscillation of the agitator. The circulating pump does not operate during the short extracting operation following the washing in soapy water. The drain pump operates during the centrifugal extracting operation following the washing in soapy water and during the short extracting operation following the stationary rinse. The drain pump does not operate during the final extracting operation. The water centrifugally extracted during this operation accordingly is stored in the bottom of the outer casing and can be used either for "soaking" or "washing" a succeeding batch of clothes. While this water is stored in the bottom of the tub, the float is in its raised position, tipping the latch 265 so the valve 233 cannot be opened by the water valve cam 272.

If the machine is to be used to wash a succeeding batch of clothes, the button 334 is depressed until the indicator turns to the beginning of the "soak" or "normal wash" cycles described above. Otherwise the button 334 is only momentarily depressed, starting the automatic regeneration of the water softener. During this cycle, the drain pump is running and the regenerative valve is held open by the lever 355 resting in depression 365 in the pump cam.

What I claim as new and desire to secure by Letters Patent of the United States, is:

1. In a washing machine, a tub, a rotatable clothes receptacle in and overflowing to the tub, means for pumping liquid from the tub to the receptacle, a liquid supply conduit having a nozzle discharging into the receptacle, a control movable to the liquid supplying and pumping positions, a timer for moving the control to the liquid supplying and pumping positions, means for holding the control in the liquid supplying position, and means responsive to the liquid in the bottom of the tub for releasing said holding means.

2. In a washing machine, a clothes receptacle, a supply conduit therefor, an overflow defining the liquid level in the clothes receptacle, a lever for controlling the flow of liquid through the conduit, a latch providing a pivot for the lever, a timing cam for pivoting the lever about said latch to the liquid supplying position, and means responsive to the liquid overflow from the receptacle for releasing said latch.

3. In a washing machine, a rotatable clothes receptacle, means for washing clothes in the receptacle and for rotating the receptacle to centrifugally dry the clothes, a casing around the receptacle for receiving and storing the liquid contents of the receptacle during centrifugal drying, a liquid supply conduit for the receptacle, a member for controlling the liquid flow in said conduit, a circulating pump for pumping liquid from the casing to the receptacle, timing means for moving said member to the liquid supplying position and starting the pump and for subsequently starting the washing operation, means for holding said member in the liquid supplying position, and means responsive to a predetermined amount of liquid in the casing for releasing said holding means.

4. In a washing machine, a rotatable clothes receptacle, means for washing clothes in the receptacle and for rotating the receptacle to centrifugally dry the clothes, a casing for receiving and storing the liquid contents of the receptacle during centrifugal drying, said receptacle being constructed to hold liquid to a predetermined level during washing and to overflow to the casing, a liquid supply conduit for the receptacle, a member for controlling the liquid flow in said conduit, a pump for pumping liquid from the casing to the receptacle, timing means for sequentially controlling a series of washing cycles each beginning with the moving of said member to the liquid supplying position and the operation of the said pump, and ending with a centrifugal drying operation, at least one of said cycles including storing in the casing the liquid contents of the receptacle discharged during centrifugal drying, a normal and a high speed drive for the timing means, manually operable means for shifting to said high speed timer drive so the operator may shorten the time of one of the washing cycles, and means responsive to a predetermined accumulation of liquid in the casing for shutting off the liquid supply whereby the liquid supplying operation is properly carried out independent of the manner in which the timing means has been operated.

5. In a washing machine, a clothes receptacle for receiving liquid and clothes, said receptacle being constructed to hold liquid, means for agitating the liquid and clothes in the receptacle, means for rotating the receptacle to centrifugally dry the clothes, a casing around the receptacle to which the receptacle overflows, a liquid supply conduit for the receptacle, means for pumping liquid from the casing to the receptacle, means for draining the casing, a sequential control for washing cycles each beginning with filling the receptacle with liquid and ending with rotating the receptacle to centrifugally dry the clothes, at least one of said cycles including storing of the liquid contents of the receptacle in the casing for use in a succeeding cycle, and means for filling the receptacle whereby the receptacle may be filled from said conduit or from the liquid in the casing including means for starting the flow of liquid through said conduit and the pumping of liquid from the casing to the receptacle, and means responsive to a predetermined amount of liquid in the casing for stopping the flow of liquid in said conduit.

6. In a washing machine, a clothes receptacle, a storage compartment for the liquid contents of the clothes receptacle arranged to receive liquid overflowing the clothes receptacle, a liquid supply conduit for the clothes receptacle, means for pumping liquid from the storage compartment to the clothes receptacle, a sequential control for washing cycles each beginning with filling the clothes receptacle with liquid, at least one of said cycles including storing of the liquid contents of the clothes receptacle in the storage compartment for use in a succeeding cycle, means under the control of the operator cooperating with said sequential control to cause the skipping of cycles including said one cycle, and means for filling the clothes receptacle whereby the clothes receptacle may be filled either from said conduit or from the storage compartment including means for starting the flow of liquid through said conduit and the pumping of liquid from the storage compartment to the clothes receptacle, and means responsive to a predetermined amount of liquid in the storage compartment for stopping the flow of liquid in said conduit.

7. In a washing machine, a rotatable clothes receptacle, said receptacle being constructed to hold liquid, means for washing clothes in the receptacle and for rotating the receptacle to centrifugally dry the clothes, a casing for receiving and storing the liquid contents of the receptacle during centrifugal drying, a liquid supply conduit for the receptacle, a member for controlling the liquid flow in said conduit, a pump for pumping liquid from the casing to the receptacle, timing means for sequentially controlling a series of washing cycles each beginning with the moving of said member to the liquid supplying position and the operation of the said pump, and ending with a centrifugal drying operation, at least one of said cycles including storing in the casing the liquid contents of the receptacle discharged during centrifugal drying, means under the control of the operator for advancing said timing means through said one cycle at a high speed relative to the normal timing speed whereby the operator may effectively skip all of said one cycle except the moving of said member to the liquid supplying position, latch means for holding said member in the liquid supplying position, and means responsive to the liquid in the casing for releasing said latch means.

8. In a washing machine, a rotatable clothes receptacle, means for washing clothes in the receptacle and for rotating the receptacle to centrifugally dry the clothes, a casing for receiving and storing the liquid contents of the receptacle during centrifugal drying, said receptacle being constructed to hold liquid to a predetermined level during washing and to overflow to the casing, a liquid supply conduit for the receptacle, means for controlling the liquid flow in said conduit, a pump for pumping liquid from the casing to the receptacle, timing means for sequentially controlling a series of washing cycles each beginning with the moving of said liquid controlling means to the liquid supplying position and the operation of the said pump, and ending with a centrifugal drying operation, at least one of said cycles including storing in the casing for use in a succeeding cycle the liquid contents of the receptacle discharged during centrifugal drying, manually operable means for shifting the timing control whereby the operator may vary the washing cycles, and means responsive to a predetermined accumulation of liquid in the casing for shutting off the liquid supply whereby the liquid supplying operation is properly carried out independent of the manner in which the timing means has been operated.

9. In a washing machine of the type having a casing, a rotatable receptacle for receiving clothes to be washed and centrifugally dried, said receptacle being constructed to hold liquid and to overflow to the casing, and means for pumping liquid from the casing to the receptacle, a conduit for supplying liquid to the receptacle, a control movable to the liquid supplying and pumping positions, and means responsive to a predetermined accumulation of liquid in the casing for stopping the flow through said conduit.

GEORGE W. DUNHAM.